Figure 1:
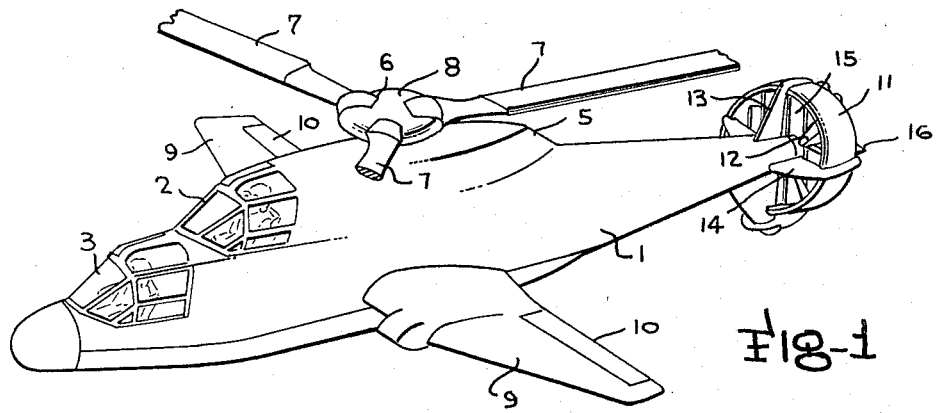

July 25, 1967 C. V. TONER 3,332,643
CONTROL SYSTEM FOR AIRCRAFT
Filed Oct. 5, 1965 4 Sheets-Sheet 1

INVENTOR
CHARLES V. TONER
BY Mason, Fenwick & Lawrence
ATTORNEYS

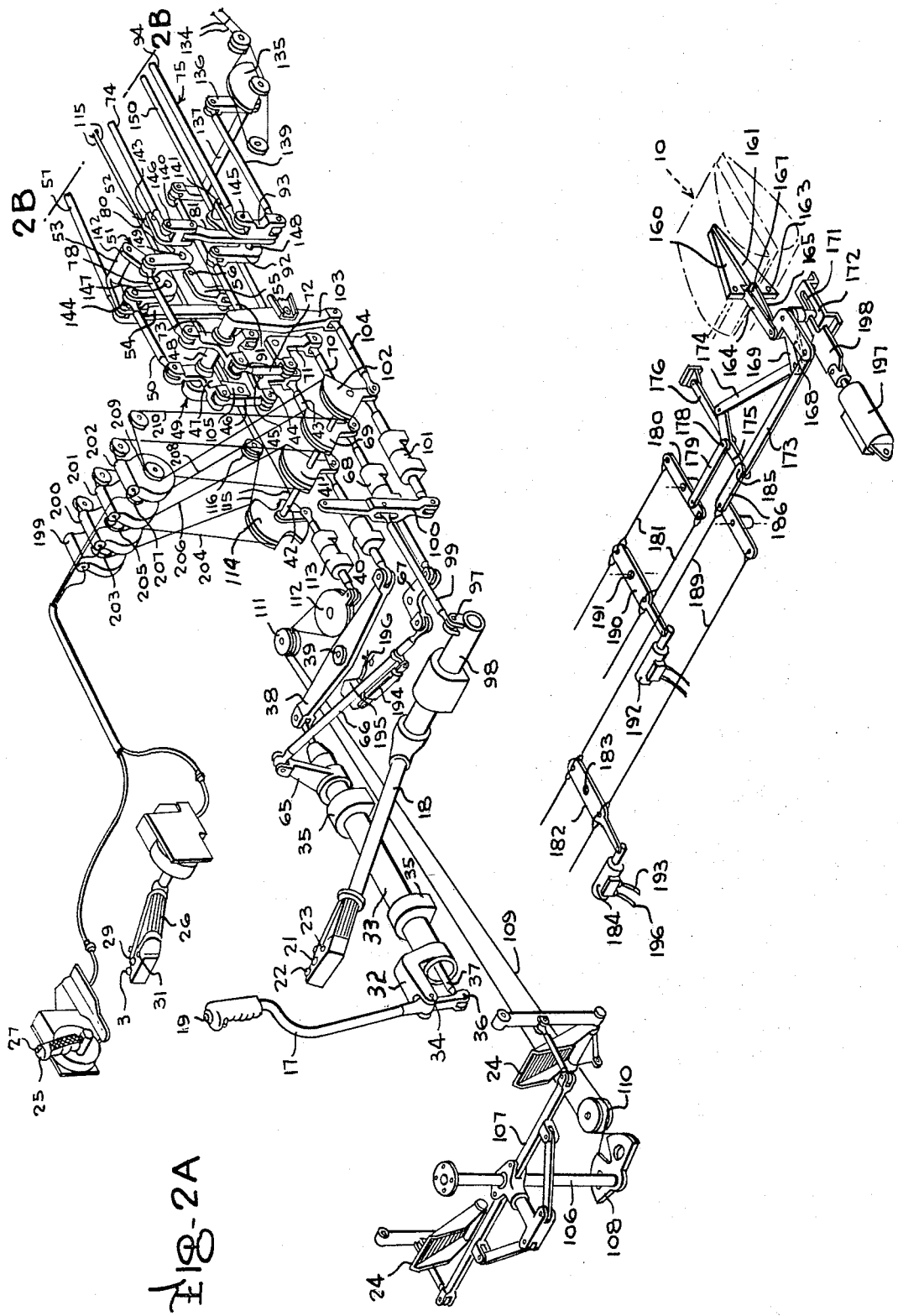

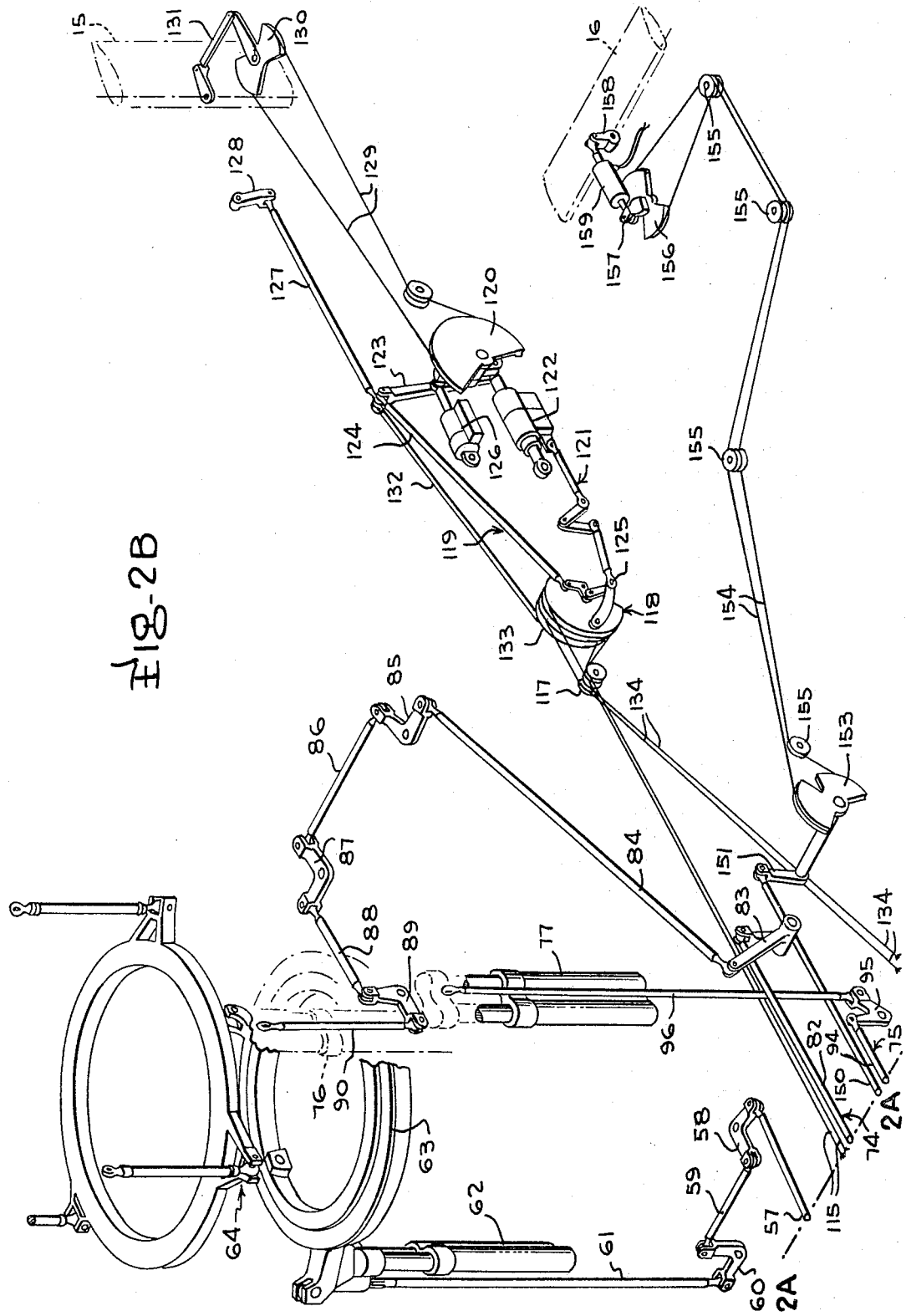

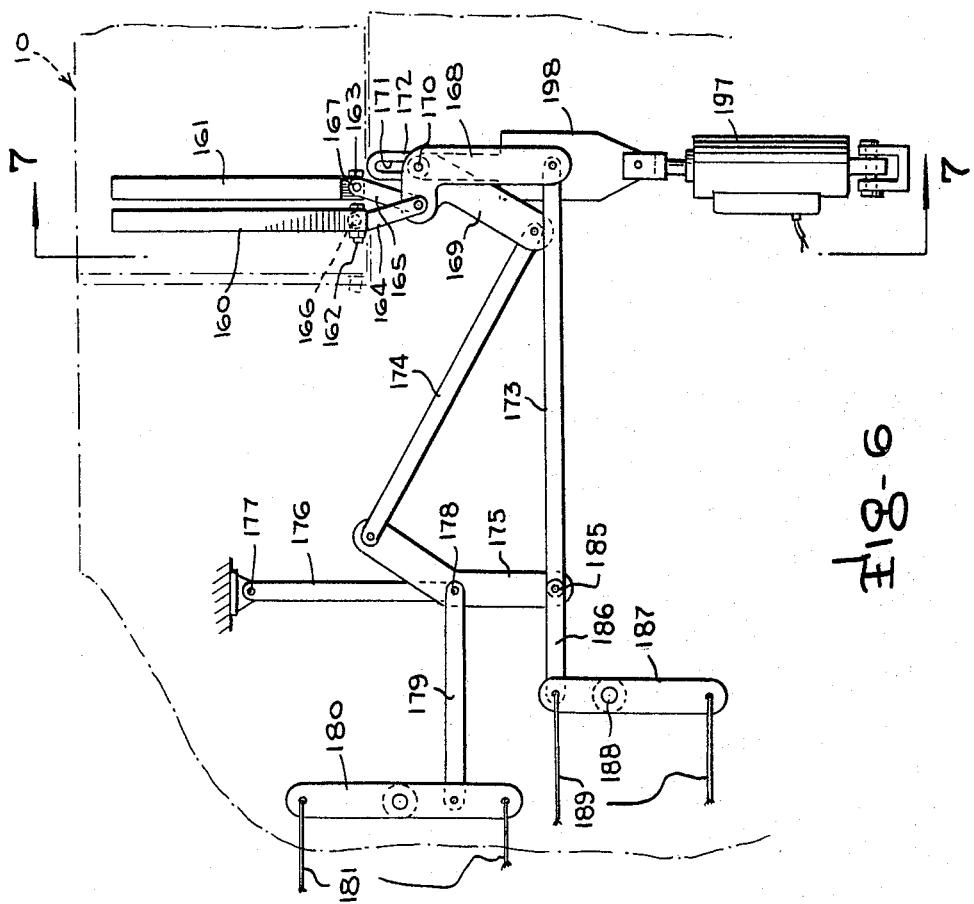
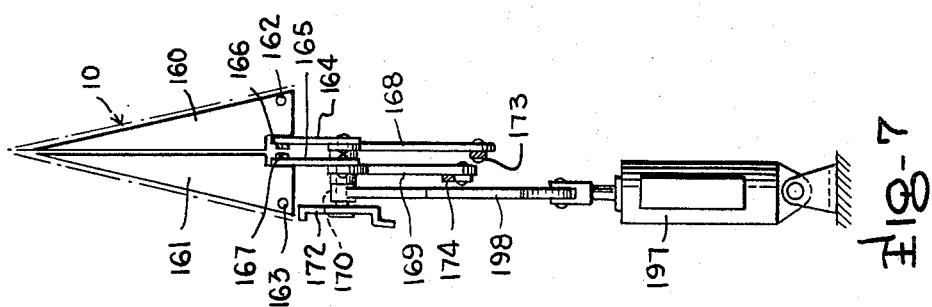

United States Patent Office 3,332,643
Patented July 25, 1967

3,332,643
CONTROL SYSTEM FOR AIRCRAFT
Charles V. Toner, Wallingford, Pa., assignor to Piasecki Aircraft Corporation, Philadelphia, Pa., a corporation of Pennsylvania
Filed Oct. 5, 1965, Ser. No. 493,062
19 Claims. (Cl. 244—7)

In the so-called "compound helicopter" having an overhead main rotor and a shrouded propeller at the tail, the rotor provides the lift in hovering and slow flight conditions and the tail propeller with the vertical vanes in the shroud, or ring, reacts the main rotor torque. In high speed forward flight, the lift is provided by the rotor and stub wings on the aircraft body, with the wings assuming a greater proportion of the lift as speed increases. In forward flight, the tail propeller provides the forward propulsion force, and the tail vanes control flight direction.

In former aircraft of the vertical take off and landing type, the transition from hovering mode to high speed mode is abrupt. In other words, the pilot, by operation of some actuator, converted the aircraft from one mode to the other, and there was no period of transition from one to the other.

The general object of the present invention is to provide a control system for compound helicopters which will automatically convert from hover to high forward speed and return without positive transition effort by the pilot, with all control movements being in response to changing trim requirements during transition.

A more specific object of the invention is to make the degree of available directional control vane movement and the main rotor swash plate control by the pilot's cyclic stick directly proportional to the pitch setting of the blades of the tail propeller, which in turn, is directly related to forward air speed. In other words, the invention proposed to increase vane neutral setting and the degree of available vane deflection in response to decrease in propeller pitch setting by the pilot, and, at the same time, increase the control of the cyclic stick over the rotor swash plate. When the pilot increases the propeller pitch to begin an increased forward speed, the directional control movement in response to rudder pedal operation and its neutral position are decreased and the rotor swash plate has less movement in response to cyclic stick movement.

Another object is the provision of means to maintain fixed aileron control from the cyclic stick regardless of rotor phase-out during forward flight.

A further object is to provide means for obtaining aileron and elevator control in the event of primary control the trailing edges of the aircraft wings.

Yet another object of the invention is to provide means for compensating for different center of gravity to provide desired flight angles.

A still further object is to provide means for trimming rudder pedal neutral positions in different modes of flight.

It is also an object to provide a primary set of controls for pilot use and an auxiliary set of controls for use by a co-pilot or gunner, either of which can be used to assume complete command of the aircraft.

It is also another object to provide emergency control of the aircraft as a conventional aircraft through the aileron and elevator control in the event of primary control failure to the overhead main rotor.

Other objects of the invention will become apparent from the following description of one practical embodiment thereof, when taken in conjunction with the drawings which accompany, and form part of this specification.

Figure 4:
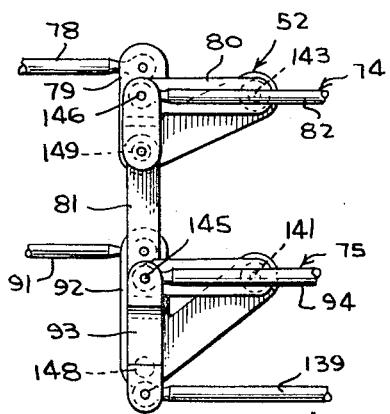
Figure 5:
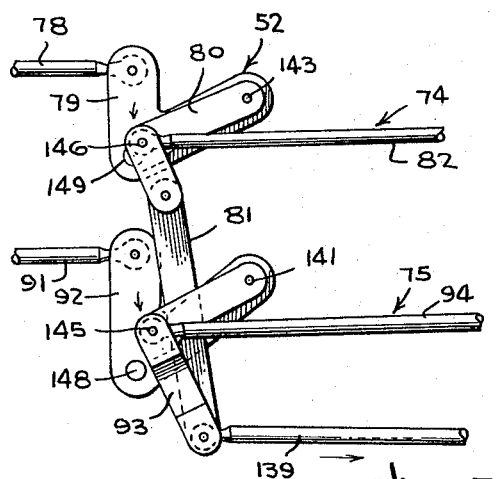
Figure 3:
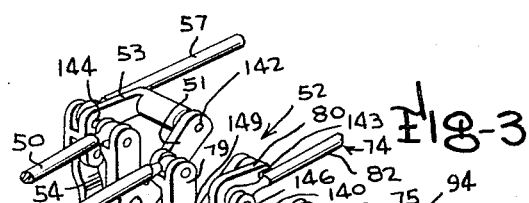

In the drawings:
FIGURE 1 is a perspective view of a compound helicopter illustrating the several control elements of the aircraft and their general location;
FIGURES 2A and 2B together present a schematic perspective view of the various controls, control elements, and the instrumentalities for actuating the control elements upon operation of the controls;
FIGURE 3 is an enlarged perspective view of a part of the cyclic control mechanism which includes a phase-out assembly;
FIGURE 4 is a side elevation of one portion of the phase-out assembly;
FIGURE 5 is another view of the phase-out assembly in another position;
FIGURE 6 is a schematic top plan view of the wing flap control mechanism; and
FIGURE 7 is a section taken on the line 7—7 of FIGURE 6.

In general, the invention is concerned with a system of control for a compound helicopter, wherein the degree of control of the main rotor by movement of the cyclic stick and the degree of directional control vane deflection in response to rudder pedal movement and their neutral position, are directly affected by the setting of the pitch of the blades of the tail propeller.

Referring to the drawings in detail, the helicopter is shown as having a body, or fuselage 1 with a pilot's compartment 2 and a copilot's, or gunner's compartment 3. The body has conventional landing gear 4. A pylon 5 extends upward from the top of the body, housing the drive shaft and controls for the main overhead rotor 6, having the usual blades 7 mounted for hinging movement relative to the rotor hub 8 to accommodate to various rotor planes of rotation, and for rotative movement to change their pitch, or angle of attack.

At each side of the body, there is a short wing 9 having flaps 10 hinged to the wing trailing edges. These flaps serve as ailerons, flaps and dive brakes, as will be described.

The tail of the aircraft is in the form of a ring, or circular shroud 11 in or on which are mounted a tail propeller 12 rotatable about an axis parallel to the longitudinal axis of the aircraft, rigid vertical and horizontal stators 13 and 14 respectively, vertical directional control vanes 15, and an elevator 16.

The rotor blades 7, flaps 10, vertical tail vanes 15, elevator 16 and the blades of the tail propeller 12 form the movable control surfaces of the aircraft, and parts of the control system of the present invention.

The controls for moving the control surfaces are located within the pilot's and copilot's compartments 2 and 3. In the pilot's compartment, there is a cyclic stick 17, movable longitudinally to control aircraft pitch and laterally for roll trim, and a collective stick or lever 18, movable upwardly to increase rotor blade pitch and downwardly to decrease rotor blade pitch. The cyclic stick handle contains an aileron control and elevator trim switch 19. The collective lever handle carries a tail propeller pitch control switch 21, a flap operating switch 22 and a dive brake control switch 23. Directional control is obtained by rudder pedals 24. In the copilot's compartment, the controls are electrical and include a cyclic handle 25 and a collective handle 26. Cyclic handle 25 will contain an aileron control and elevator trim switch 27. Collective handle 26 will contain a propeller pitch control switch 29, a flap operating switch 30 and a dive brake control switch 31.

Through appropriate mechanism, to be described, the cyclic stick 17 and cyclic handle 25, or the switches thereon, are each connected to the main rotor 6 to control its rotation path, to the elevator 16 to control aircraft pitch trim, and to the ailerons and flaps for roll trim. The collective lever 18 and collective handle 26, or the switches thereon, are each connected to the rotor for rotor blade pitch change, to the tail propeller pitch changing mechanism and to the dive brakes. Thus, the attitude of the aircraft is controlled from, or by means of, the cyclic stick, while the flight mode is controlled by or from, the collective lever. Flight direction is controlled by the rudder pedals 24 or the cyclic handle 25, depending upon whether control is from the pilot's compartment or the copilot's compartment.

Cyclic stick 17 is mounted for pivotal movement fore and aft and laterally. To this end, the stick is pivoted slightly above its bottom end to a bracket 32 carried at one end of a mounting sleeve 33. A pivot pin 34 connects the stick and bracket, and allows the stick to pivot fore and aft. The sleeve 33, in turn, is rotatively mounted in bearings 35 carried by the aircraft. Stick 17 can be moved from side to side by rocking the sleeve in its bearings. The lower end of the stick which projects below the pivot 34 is pivotally connected, at 36, to a rod 37 which extends through, and is slidably axially within the sleeve 33. The rod projects beyond the far end of the sleeve, and is connected to one end of a lever 38 which is pivoted at 39, intermediate its ends to the aircraft. The opposite ends of lever 38 is connected to one end of a power actuator 40, which may be in the form of a conventional stability augmentation system link. The actuator, in turn, is attached to a quadrant 41, freely mounted on a shaft 42. A link 43 has one end connected to the quadrant, and its other end pivotally secured to a bellcrank 44, mounted, at 45, on the aircraft. The bellcrank is also connected to a second, vertical, link 46 which couples bellcrank 44 to another bellcrank 47 pivoted on movable shaft 48 of the mixing assembly 49. Bellcrank 47 is coupled by connector 50 to still another bellcrank 51 forming part of the rotor high speed phase-out assembly 52. The last-mentioned bellcrank 51, is connected by means of a bellcrank 53 to the top of a vertical lever 54, pivotally connected at its bottom to a positioning bellcrank 55. Bellcrank 55 is connected at its opposite end to a fixed portion of the aircraft, as at 56. The bellcrank 53 between bellcrank 51 and vertical lever 54 is connected at its center to one end of a control rod 57. This rod, through bellcrank 58, link 59, bellcrank 60 and rod 61, is connected to a dual hydraulic actuator 62 which is coupled to the lower ring 63 of the swash plate control assembly 64, and controls longitudinal tilting of the swash plate and, consequently, the fore and aft tilt of the rotor rotation plane.

The cyclic stick mounting sleeve 33 carries a lever 65 which has a rocking movement laterally of the aircraft when the cyclic stick 17 is moved from side to side. Lever 65 is connected by link 66 to one end of a bellcrank 67 which has its other end attached to an actuator 68 which is interposed between the bellcrank 67 and a quadrant 69 freely mounted on shaft 42. The quadrant is connected by link 70 to bellcrank 71, which, in turn, is connected by link 72 to crank 73 on movable shaft 48 of the mixing assembly 49. Crank 73 has three arms, and link 72 connects to one of them. The other two are connected by appropriate linkage trains 74 and 75 to the dual hydraulic actuators 76 and 77 which control lateral tilting of the lower ring 63 of the swash plate control assembly 64.

Linkage train 74 includes a link 78 from crank 73 to a bellcrank 79 forming part of the rotor phase-out mechanism. Bellcrank 79 is pivoted to one end of a bellcrank 80 which has its other end connected to the top of vertical lever 81. The center of bellcrank 80 is pivotally attached to a rod 82 and this through crank 83, rod 84, crank 85, link 86, crank 87, link 88, crank 89 and rod 90 is connected to the actuator 76.

Linkage train 75 starts from the lower, third arm of crank 73 which is connected to a link 91 that extends to a bellcrank 92. The bellcrank 92 is also connected to one arm of a positioning bellcrank 93, which has its other arm joined to the bottom of vertical lever 81. The center of bellcrank 93 is pivotally connected to rod 94. Rod 94, through bellcrank 95 and rod 96, is connected to the dual actuator 77.

It is to be noted that when crank 73 is rocked, its upper and lower arms move in opposite directions. The linkage trains 74 and 75 are so arranged that this movement of the crank arms is transmitted to the actuators 76 and 77 to operate them in opposite directions and so cause lateral tilting of the rotor lower control ring 63 and lateral tilting of the rotor rotational plane.

While the cyclic stick controls the rotor rotational plane, the lift of the rotor is determined by the pitch of the blades. The blade pitch change is accomplished in wellknown manner by raising and lowering the swash plate by moving the several cyclic controlling linkages collectively in one direction or the other to obtain a vertical movement of the control ring 63 without affecting its plane angles. This is done by the collective lever 18, which is connected through suitable linkage to the movable shaft 48, to shift the cranks 47 and 73 and, through them, the linkages to the actuators 62, 76 and 77.

The linkage illustrated for connecting the collective lever and shaft 48, includes an arm 97 in the collective lever mounting shaft 98 to which a link 99 is connected. Link 99 is pivotally attached to a vertical lever 100 intermediate the lever ends, the lever being pivoted at its top to a fixed part of the aircraft. The bottom end of lever 100 is attached to actuator 101, which connects to quadrant 102 on shaft 42. The quadrant is coupled to the bottom end of a lever 103 by link 104. Lever 103 is pivoted intermediate its ends to the aircraft and supports shaft 48 at its top. The opposite end of shaft 48 is supported upon a lever 105 also pivoted on a fixed part of the aircraft. By means of this linkage, the rotor blade pitch, can be adjusted by raising or lowering the collective lever 18.

Rudder pedals 24 are mounted on opposite sides of a rudder post 106 through a cross arm and rudder pedal position, adjusting means 107. This can be conventional, and needs no detailed description for an understanding of the present invention. Post 106 carries a quadrant 108 to which control cables 109 are connected. The cables pass around suitable pulleys 110 and 111 to a quadrant 112 which is connected to an actuator 113. The actuator is coupled to a quadrant 114 to which control wires 115 are attached. The wires are guided over pulleys 116 and 117 to a quadrant 118 of a mechanism 119 for determining the ratio of rudder control in accordance with the pitch setting of the tail propeller 12. The mechanism 119 is described in detail in copending application of Meyers and Stroukoff, Ser. No. 429,814 filed February 2, 1965, now Patent No. 3,309,937, entitled Coordinating Control Linkage, and that application may be referred to for the details of construction. It will suffice to state here that movement of quadrant 118 is transmitted to quadrant 120 through linkage 121 and actuator 122. The amount of movement transmitted is determined by the position of the propeller pitch control lever 123 which shifts rod 124 and varies the distance of pivot 125 of linkage 121 from the center of quadrant 118. Lever 123 is moved by actuator 126 upon operation of the pitch control beep switch 21 on the collective lever 18. Movement of the lever moves rod 127, which is connected to the pitch changing mechanism indicated by the lever 128. As fully described in the abovementioned application, operation of switch 21 controls the propeller pitch and through mechanism 119 the ratio of rudder control. However, when the propeller pitch is reduced for hovering and vertical movement of the aircraft, movement of quadrant 120 will cause increase in propeller pitch with increased rudder movement.

Quadrant 120 is connected by wires 129 to rudder quadrant 130, and that quadrant is connected to vanes 15 by link 131. A suitable arrangement of vanes and their connection to, and operation from, the rudder quadrant may be found in copending application of Oleg Stroukoff, Serial No. 415,680, filed December 3, 1964, now Patent No. 3,260,482, entitled Directional Control Assembly, and that application may be referred to for a description of this structure. It is desirable that the cylic stick control over the rotor be reduced when the aircraft is in high speed forward flight, yet retain full authority over the ailerons for roll trim and the elevator vane 16 for pitch trim, as will be described. In order to automatically phase-out the cyclic stick control of the rotor, a connection is made between the tail propeller pitch control mechanism and the phase-out assembly 52. This may be done by connecting a rod 132 to the pitch control lever 123 of the rudder ratio changer 119 and to a quadrant 133 so that movement of the pitch control lever will rotate the quadrant. Quadrant 133 is connected by cables 134 to a quadrant 135 forming part of the phase-out mechanism. The latter quadrant carries a lever 136 mounted on a shaft 137, which has a second lever arm 138 fixed to it at a distance from lever 136. A link 139 connects lever 136 and the bottom of bellcrank 93. A second link 140 connects lever 138 and the bottom of bellcrank 55. The result of this arrangement is a shifting of bellcrank 55 and 93 about their respective pivots 56 and 141, and through levers 54 and 81, a shifting of bellcranks 53 and 80 about their pivots 142 and 143. This will raise and lower the pivotal connection 144 between bellcrank 53 and the rod 57, 145 between bellcrank 93 and rod 94, and 146 between bellcrank 80 and rod 82. This will cause the pivots 144, 145 and 146 to approach, or move from, the fixed pivots 147, 148 and 149 of the bellcranks 51, 92 and 79. This reduces or increases the effective throw of the several bellcranks insofar as their effect upon movement of control rods 57, 94 and 82 is concerned. Thus, when lever 123 is moved to increase tail propeller pitch (to the left as viewed in FIGURE 2) to convert to forward flight, quadrant 135 will be moved to shift the bellcrank 53, 93 and 80 to bring the pivots 144, 145 and 146 closer to the pivots 147, 148 and 149 and thus reduce the effect of cyclic stick movement upon the rotor. When tail propeller pitch is reduced, the bellcranks in question are lifted and full control is restored to the cyclic stick.

In order to control the elevator vane 16 from the cyclic stick, yet have full control of the elevator when the cyclic stick control of the rotor is phased-out, a link 150 is connected to the bottom of bellcrank 44 of the longitudinal control linkage train ahead of the phase-out mechanism. Link 150 connects at its opposite end to a lever 151 on a shaft 152, which also carries a quadrant 153. The quadrant has cables 154 attached to it, which pass over suitable pulleys 155 for connection to a quadrant 156. Quadrant 156 has a lever 157 connected to the elevator vane operating lever 158 by a link 159. While the connections from lever 157 to lever 158 could be by an ordinary, inextensible link, the link shown is an actuator so that the link length can be increased or decreased to trim the vane, and compensate for changed center of gravity or other condition requiring pitch trim. The actuator is connected to, and controlled by the aileron-control-elevator-trim switch 19 on the cyclic stick. It is possible by operating switch 19 to trim the elevator vane to the proper degree to achieve a desired aircraft pitch altitude for a neutral position of the cyclic stick.

The cyclic stick is also used to control the aileron action of flaps 10 on the wings 9. This can be done by lateral movement of the stick, or by operation of the aileron control elevator trim switch 19 on the cyclic stick. The flap on each wing is in two parts, an upper control surface member 160 and a lower control surface member 161, each hingedly connected to the trailing edge of the wing. The upper control surface members 160 are hinged to the wings at 162, and the lower control surface members 161 are hinged to the wings at 163. Controls are provided by which the surface members operate as ailerons, when an upper surface member of one flap is raised while the lower surface member of the other flap is lowered, as flaps, when the upper or lower surfaces of the two flaps move in unison, and as dive brakes, when the two surface members of each flap move in opposite directions simultaneously.

While several known linkage arrangements for operating the members may be used, in the one chosen for purposes of illustration the two members forming each flap are of right triangular cross-sections, and they have a neutral position in which the altitudes of the two triangles are adjacent. It will be noted that the hinge points 162 and 163 are at the juncture of the triangle bases and the hypotenuse, so that the hinge points are at the remote corners of the respective triangles. In order to swing the members about their respective hinges, the inner, or adjacent, corners of the members are connected, respectively, to links 164 and 165 by pivot connections 166 and 167. The opposite ends of the links are pivotally joined to the respective short arms of bellcranks 168 and 169. The bellcranks are rotatably mounted on a common pivot 170 which is free for sliding movement in a slot 171 in a bracket 172 fixedly mounted in the wing. The opposite arms of the bellcranks are pivotally connected to the end of links 173 and 174, which, in turn, are connected to opposite ends of a bellcrank 175. Bellcrank 175 is mounted at its center on one end of a swinging lever 176 which is attached at its other end to a fixed part of the wing, as at 177. Connection 178, between bellcrank 175 and lever 176, also connects the bellcrank and lever to a link 179 extending from one end of a flap control lever 180. This lever is pivoted at its center to the wing and has its ends connected by suitable cables 181 to a flap input lever 190. The lever 190 is pivoted at 191 and is moved about its pivot by an operator 192 controlled from switch button 22 on the handle of the collective pitch lever 18. Operation of switch 22 will cause rocking of the input and control levers 190 and 180 and through link 179, rocking of bellcrank 175 about its connections 185 with link 173. The bellcrank swings upon lever 176 and moves link 174 to rotate bellcrank 169 and, through link 165, rotates flap member 161 downward in a conventional flap movement. When the control levers are moved in the opposite direction, bellcrank 175 will move in the opposite direction, again swinging about pivot 185. This will exert a pushing force upon link 174, tending to rock bellcrank 169 in a counter-clockwise direction (as viewed in FIGURE 6). In view of the fact that member 161 is in its neutral position and cannot move upward, bellcrank 169 cannot rock about common pivot 170. Therefore, the bellcrank will rock about its connections with link 165 causing the common pivot 170 to move in slot 171 toward the members 160 and 161. This will move bellcrank 168 in the same direction to exert pressure upon link 164 and rock element 160 about its pivot into a flap-up position.

Bellcrank 175 is also connected by link 186 to an aileron control lever 187 pivoted on the wing at 188. The link is connected at pivot 185 between the bellcrank 175 and link 173. Cables 189 connect lever 187 with an aileron input lever 182, also pivoted on the wing as at 183. Lever 182 is moved by an operator 184 connected by electric wires 193 with aileron control-elevator trim switch 19 on cyclic stick 17. The operator is also controlled by movement of the cyclic stick through a link 194 connected to link 66 of the cyclic stick linkage. Link 194 operates an electric potentiometer 195, which is connected by wires 196 to the operator 184. Thus, aileron control can be had either as a result of lateral movement of the cyclic stick, or roll trim can be effected by operation of switch 19 on the cyclic stick.

When the flap members are to be used as brakes, they are operated by an actuator 197 fixed to the wing. The actuator is connected to plate 198 through which the pivot 170, common to the two bellcranks passes, and which is movable with the pivot 170 in its travel along slot 172. By this connection, movement of the actuator 197 will move plate 198 and pivot 170, thus moving both bellcranks 168 and 169 bodily. The movement of the bellcranks is transferred by links 164 and 165 to the flap members. As the movement of both links is in the same direction, the flap members 160 and 161 will be caused to move in opposite directions, the member 160 lifting and the member 161 lowering. This produces an effective air brake. The brake action is obtained by operation of the dive brake switch 23 on the collective stick which energizes actuator 197.

The cyclic handle 25 and the collective handle 26 in the copilot's compartment, or position, are connected into the main cyclic and collective linkage systems so that complete control of the aircraft can be had either by the pilot or copilot. To this end, the cyclic handle is connected, in well-known fashion, electrically, to the actuators 199, 200 and 201. The collective handle is similarly connected to actuator 202. Actuator 199 causes movement of its drive pulley 203, and drive cable 204 passes around the pulley and are connected to quadrant 114 of the rudder pedal control system, so that operation of the actuator 199 will cause control movement of the vertical vanes 15 in the same manner as by operation of the rudder pedals. Actuator 199 is actuated by rotation of cyclic handle 25.

Forward and backward movement of cyclic handle 25 will cause operation of actuator 200, which has its pulley 205 coupled by cable 206 to the longitudinal control quadrant 41, so that fore and aft tilting of the rotor and vertical movement of the horizontal vane 16 may be had.

Lateral movement of the cyclic handle will operate actuator 201. This actuator has its pulley 207 connected by cable 208 to quadrant 69 in the lateral control linkage.

The actuator 202 is operated by vertical movement of the collective handle 26. The actuator has a pulley 209, and a cable 210 connects the pulley and the collective quadrant 102. Thus, movement of collective handle 26 provides the same control as movement of the collective stick 18.

In operating the helicopter, the usual turbine (not shown) is started to supply the required drive for the overhead rotor 6 and the tail propeller 12. The collective stick can be moved to check rotor blade pitch operation, and beeper switch 21 can be operated to check propeller pitch. The usual checking of instruments and controls will be followed. The aircraft is then ready for takeoff.

If a vertical takeoff is to be made, the tail propeller pitch will be adjusted to a low position by means of the pitch control switch 21 on the collective lever. This adjustment, through the ratio changer mechanism 119, will deflect the vertical vanes 15 to the left (to counteract the torque of rotor movement). Operation of the collective stick 18 to increase rotor blade pitch will result in takeoff. Directional control is had by vane movement under control of the rudder pedals. When the rudder pedals are moved toward hard left rudder position, not only will the vanes 15 be adjusted, but the propeller pitch will be increased as well, as described in above-mentioned copending application Serial No. 429,814.

This combination of control results in a highly desirable feature. By changing propeller pitch with the beeper switch 21, the directional control pedals can be trimmed to neutral for any hovering or slow flight regime. As the propeller switch is in the low setting at this time, it uses only the power required for antitorque and directional control, and the major portion of the power delivered by the turbine is available to the rotor.

The aircraft is accelerated from hovering into forward flight by means of the longitudinal cyclic pitch control. This inclines forwardly the rotor plane in conventional fashion. As speed increases, the collective pitch is decreased and the rotor unloaded. At the same time, the propeller pitch is increased by means of switch 21, and the aircraft accelerated into cruising, or high speed flight. Increasing the propeller pitch causes ratio changer mechanism 119 to return the deflected vanes 15 to, or near, the trailing position. From this point on, directional control is achieved solely by means of actuation of the vanes 15 by the rudder pedals. As the propeller pitch is increased, quadrant 133 is rocked to actuate quadrant 135 of the rotor phase-out mechanism. This will shift the bellcrank pivot positions in the mixing assembly 49, as previously described, to reduce the control of the cyclic stick over the rotor. It will be noted, however, that this has no effect upon cyclic stick control of the ailerons or horizontal vane 16.

In high speed forward flight, directional control is solely by means of the rudder pedals while roll trim and pitch are controlled by the cyclic stick. Longitudinal trim for various center of gravity locations is obtained by operation of the aileron control, elevator trim switch 19 on the cyclic stick. This will cause actuator 159 to raise or lower horizontal vane 16 as required. Aileron control, elevator trim switch 19 on the cyclic stick can be operated for lateral trimming. It is to be remembered that in all flight regimes, full control can be taken by the copilot through operation of control handles 25 and 26.

In going from high forward speed to hover, the tail propeller pitch is reduced to slow forward speed. At the same time, the phase-out mechanism is operated to restore full rotor control to the cyclic stick. Operation of the collective stick to increase rotor pitch will cause the rotor to take the load and relieve the wings. The aircraft can be landed in conventional helicopter fashion.

Autorotative landings can be accomplished at low forward speed by using conventional helicopter techniques. In case of an engine failure while operating at a low altitude, the aircraft must be able to enter into an autorotative glide without going above radar detection altitude. Therefore, at low levels the rotor pitch can be kept in the autorotative range so that no conversion of collective pitch is necessary to enter into autorotation. Tail propeller pitch is reduced, and flaps may be dropped for a steeper descent. Flaps are kept up for extending the glide. A cyclic and collective flare is made to effect a vertical landing. If there is a malfunction in the rotor cyclic system, either in the rotor-hinge assembly itself, or in the dual servo system that controls it, the flare can be made by the cyclic stick using only the aerodynamic surfaces (wing flaps, horizontal tail vane and vertical tail vanes) for control. However, in this case it would be necessary to have sufficient airspeed to enable the aerodynamic surfaces to provide adequate control until touchdown.

To make a running take off, the cyclic stick is moved forward to effect forward longitudinal cyclic pitch of the rotor to achieve maximum acceleration. During this phase, the flaps are not deflected and the aircraft reaches a nose-down, two point attitude until a speed sufficiently greater than that associated with the chosen gross weight for straight takeoff is reached. At this point, lift is developed by displacing longitudinal cyclic aft and deflecting the flaps. Climb-out is continued by using cyclic and collective pitch to obtain optimum angle and rate of climb. Transition to cruise and high speed flight will be as previously described.

It will be seen that the control system disclosed provides for either hover flight, wherein the overhead rotor supplies the lift, or high speed forward flight, wherein the wings provide the lift, with the two being controlled from the same set of pilot controls. The aircraft is capable of flight in either regime in case of failure of one, and the transition from one to the other is without positive transition effort by the pilot. All control movements from hover to high speed forward flight are in response to changing trim requirements. In addition to this, there are two sets of pilot controls, one in the pilot's compartment and the other in a secondary compartment to be occupied by a copilot or gunner, and the aircraft can be operated in both regimes by either set of controls.

While in the above one practical embodiment of the invention has been disclosed, it will be understood that the particular structure disclosed is merely by way of example, and the invention may take other forms within the scope of the appended claims.

What is claimed is:

1. A control system for aircraft having an overhead rotor, a shrouded tail propeller, vertical and horizontal vanes pivotally carried by the shroud, and wings having movable elements on the trailing edge thereof comprising, a pilot's position, a cyclic stick and a collective stick at the pilot's position, cyclic linkage interconnecting the cyclic stick and the overhead rotor for tilting the rotor laterally upon lateral movement of the cyclic stick, cyclic linkage interconnecting the cyclic stick and the overhead rotor for tilting the rotor longitudinally upon fore and aft movement of the cyclic stick, collective linkage interconnecting the collective stick and the two-mentioned cyclic linkages to vary the overhead rotor blade pitch upon movement of the collective stick, means for adjusting the pitch of the tail propeller, and means interconnecting the tail propeller pitch changing means and the two-mentioned cyclic linkages to reduce the control movement imparted by the two-mentioned cyclic linkages to the overhead rotor in response to cyclic stick movement upon operation of the tail propeller pitch control means to increase the pitch of the tail propeller.

2. A control system for aircraft as claimed in claim 1 wherein, there is a connection between the cyclic linkage controlling longitudinal tilting of the overhead rotor and the horizontal vane on the shroud whereby fore and aft movement of the cyclic stick causes up and down tilting of the horizontal vane for pitch control of the aircraft, the last-mentioned connection being ahead of the connection of the cyclic stick control reducing means to the cyclic linkages, whereby the ratio of operation of the horizontal vane to cyclic stick movement remains constant.

3. A control system for aircraft as claimed in claim 2 wherein, the connection between the cyclic stick and the horizontal vane includes a vane trimming means for changing the horizontal vane position relative to the cyclic stick position, and means at the pilot's position for operating the vane trimming means.

4. A control system for aircraft as claimed in claim 3 wherein, the means for operating the vane trimming means is located on the cyclic stick.

5. A control system for aircraft as claimed in claim 3 wherein, there are rudder pedals and controls from the rudder pedals to the vertical shroud vanes for turning the vertical vanes laterally upon movement of the rudder pedals.

6. A control system for aircraft as claimed in claim 5 wherein, the control means between the rudder pedals and vertical vanes includes neutral position and ratio changing means interconnected between said control means and the tail propeller pitch control means to vary the neutral position and control movement of the vertical vanes in response to rudder pedal movement inversely to pitch increase and decrease of the tail propeller.

7. A control system for aircraft as claimed in claim 6 wherein, there is means at the pilot's position for operating the movable elements on the wing edge as ailerons, means at the pilot's position for operating the said movable elements as flaps, means at the pilot's position for operating the said movable members as wing brakes, and means interconnecting the cyclic stick and the said movable elements to move the elements as ailerons upon lateral movement of the cyclic stick.

8. A control system for aircraft as claimed in claim 7 wherein, the means interconnecting the cyclic stick and the movable elements to move the elements as ailerons is interconnected to the first mentioned cyclic linkage ahead of the interconnection of the means to reduce control movement imparted by that cyclic linkage to the overhead rotor in response to cyclic stick movement, whereby the cyclic stick control over aileron movement remains constant.

9. A control system for aircraft as claimed in claim 8 wherein, there is a second control position, cyclic and collective controls at the second position, and means interconnecting the cyclic and collective controls at the second position with the two-mentioned cyclic linkages, the collective linkage and the rudder controls to provide for alternate control at the pilot's position and the second control position.

10. A control system for aircraft as claimed in claim 1 wherein, there are rudder pedals and controls from the rudder pedals to the vertical shroud vanes for turning the vertical vanes laterally upon movement of the rudder pedals, and the control means between the rudders and vertical vanes includes neutral position and ratio changing means interconnected between said control means and the propeller pitch control means to vary the control neutral position and movement of the vertical vanes in response to rudder pedal movement inversely to pitch increase and decrease of the tail propeller.

11. A control system for aircraft as claimed in claim 1 wherein, the two-mentioned cyclic linkages include pivoted levers, and the means to reduce control movement imparted by the two-mentioned cyclic linkages to the overhead rotor in response to cyclic stick movement includes means to vary the effective throw of said pivoted levers.

12. A control system for aircraft having an overhead rotor, a shrouded tail propeller, vertical and horizontal vanes pivotally carried by the shroud, and wings having movable elements on the trailing edges thereof comprising, a pilot's position, a cyclic stick and a collective stick at the pilot's position, cyclic linkage interconnecting the cyclic stick and the overhead rotor for tilting the rotor laterally upon lateral movement of the cyclic stick, cyclic linkage interconnecting the cyclic stick and the overhead rotor for tilting the rotor longitudinally upon fore and aft movement of the cyclic stick, collective linkage interconnecting the collective stick and the two-mentioned cyclic linkages to vary the overhead rotor pitch upon movement of the collective stick, means for adjusting the pitch of the tail propeller, and a connection between the cyclic linkage controlling longitudinal tilting of the overhead rotor and the horizontal vane at the shroud, whereby fore and aft movement of the cyclic stick causes up and down tilting of the horizontal vane for pitch control of the aircraft.

13. A control system for aircraft as claimed in claim 12 wherein, the connection between the cyclic stick and the horizontal vane includes a vane trimming means for changing the horizontal vane position relative to the cyclic stick position, and means at the pilot's position for operating the vane trimming means.

14. A control system for aircraft as claimed in claim 13 wherein, the means for operating the vane trimming means is located on the cyclic stick.

15. A control system for aircraft as claimed in claim 13 wherein, there are rudder pedals and controls from the rudder pedals to the vertical shroud vanes for turning the vertical vanes laterally upon movement of the rudder pedals.

16. A control system for aircraft as claimed in claim 15 wherein, the control means between the rudder pedals and vertical vanes includes neutral position and ratio changing means interconnected between said control means and the tail propeller pitch control means to vary the control movement of the vertical vanes in response to rudder pedal movement inversely to pitch increase and decrease of the tail propeller.

17. A control system for aircraft as claimed in claim 16 wherein, there is means at the pilot's position for operating the movable elements on the wing edge as ailerons, means at the pilot's position for operating the said movable elements as flaps, means at the pilot's position for operating the said movable members as wing brakes, and means interconnecting the cyclic stick and the said movable elements to move the elements as ailerons upon lateral movement of the cyclic stick.

18. A control system for aircraft as claimed in claim 17 wherein, there is a second control position, cyclic and collective controls at the second position, and means interconnecting the cyclic and collective controls at the second position with the two-mentioned cyclic linkages, the collective linkage and the rudder controls to provide for alternate control at the pilot's position and the second control position.

19. A control system for aircraft as claimed in claim 12 wherein, there are rudder pedals and controls from the rudder pedals to the vertical shroud vanes for turning the vertical vanes laterally upon movement of the rudder pedals, and the control means between the rudders and vertical vanes includes neutral position and ratio changing means interconnected between said control means and the propeller pitch control means to vary the control movement of the vertical vanes in response to rudder pedal movement inversely to pitch increase and decrease of the tail propeller.

References Cited
UNITED STATES PATENTS

| | | | |
|---|---|---|---|
| 3,105,659 | 10/1963 | Stutz | 244—7 |
| 3,199,601 | 8/1965 | Dean et al. | 244—17.21 X |
| 3,222,012 | 12/1965 | Piasecki | 244—17.21 X |

MILTON BUCHLER, *Primary Examiner.*

P. E. SAUBERER, *Assistant Examiner.*